United States Patent [19]
Gieles et al.

[11] 3,838,379
[45] Sept. 24, 1974

[54] PRESSURE TRANSDUCER FOR LIQUIDS OR GASES
[75] Inventors: Antonius Cornelis Maria Gieles; Petrus Franciscus Antonius Haans; Johannes Van Esdonk, all of Emmasingel, Eindhoven, Netherlands
[73] Assignee: U.S. Philips Corporation, New York, N.Y.
[22] Filed: Jan. 8, 1973
[21] Appl. No.: 321,789

[30] Foreign Application Priority Data
Jan. 12, 1972  Netherlands................. 7200438

[52] U.S. Cl................................... 338/42, 338/4
[51] Int. Cl................................... H01c 13/00
[58] Field of Search.............. 338/2, 4, 5, 42; 73/88.5 SD

[56] References Cited
UNITED STATES PATENTS
3,513,430  5/1970  Heller.................................. 338/4
3,654,579  4/1972  Kurtz.................................. 338/2

Primary Examiner—C. L. Albritton
Attorney, Agent, or Firm—Frank R. Trifari

[57] ABSTRACT

A pressure transducer comprising a tubular support which is closed on one end by a semiconductor device for converting mechanical stresses into electrical signals.

Current supply conductors for the semiconductor device extend through ducts in the tube wall. These current supply conductors preferably consist of cemented metal wires.

5 Claims, 6 Drawing Figures

PRESSURE TRANSDUCER FOR LIQUIDS OR GASES

The invention relates to a pressure transducer for measuring the pressure in a liquid or gas, consisting of a tubular support which is closed on one end by a device for converting mechanical stresses into electrical signals, the said device consisting mainly of a semiconductor diaphragm having a thickened supporting rim, one side of which accommodates electrical connection terminals which are connected to current supply conductors.

In a previously proposed pressure transducer of this kind (see Netherlands Patent application 6817089) the current supply conductors extend from the connection terminals to an annular insulating disc, arranged in the tubular support at a small distance from the semiconductor diaphragm, where they are soldered to electrical feed-throughs. On the other side of the disc the feed-throughs are connected to a measuring circuit via an insulated connection cable. This construction has the drawback that the disc with feed-throughs requires additional space in the support, and that it is very difficult to make the required solder connections within the narrow space in the support.

The invention has for its object to eliminate the said drawbacks by providing a construction by means of which the required electrical and mechanical connections can be realized in a very reliable and simple manner. To this end the construction according to the invention is characterized in that each of the current supply conductors extends through a duct which extends through the tube wall in the longitudinal direction of the tubular support. The required connections can then be made on the end of the support instead of inside the support. Moreover, the ring with feed-throughs can then be omitted.

The tube wall is preferably made of an insulating material so that no additional provisions are required for insulating the current supply conductors from the tube wall.

The mounting is particularly simple if the ends of the current conductors which are connected to the connection terminals are flat ground and are arranged in the end face of the support which is also flat ground.

The supporting rim can then be pressed, for example, with solder bumps provided on the connection terminals, against the flat ground ends of the current conductors, after which the assembly is heated until the solder melts. The connections can alternatively be made by providing a conductive glue between the connection terminals and the ends of the current conductors, and by subsequently pressing the supporting rim against the flat ground end face of the support.

Proper sealing of the seam between the supporting rim and the end face of the support is achieved in that the side of the supporting rim which accommodates the connection terminals is provided with a metallized region which annularly envelops the connection terminals, the said region being connected to a corresponding region on the end face of the support by a soldered connection, the ends of the current supply conductors and the connection terminals also being connected to each other by soldered connections.

In view of its small dimensions, the pressure transducer according to the invention is particularly suitable for measuring the blood pressure in a blood vessel. To this end the pressure transducer is mounted on the end of a catheter which can be inserted into the blood vessel.

A very suitable method of manufacturing a support for the pressure transducer according to the invention is characterized in that holes are provided in a rod of the material to be used for manufacturing the support, the location and the dimensions of said holes being such that the cross-section of the rod is a representation at an enlarged scale of the cross-section of the support, the said rod being subsequently plastically deformed until the cross-section is equal to that of the support, after which supports are formed from the rod by the separation of pieces of the desired length. It was found that during the deformation of the rod, for example, by drawing, the cross-section is reduced to scale, so that the pieces separated from the rod have exactly the correct dimensions.

Particularly attractive results are obtained if the rod is made of a glass type having a coefficient of expansion which is approximately equal to that of the material of the supporting rim of the semiconductor diaphragm, the said rod being plastically deformed after provision of the holes by heating the rod to a temperature above the softening point of the glass, and by subsequently drawing the rod.

The invention will be described in detail with reference to the drawing. Therein:

Figure 1:
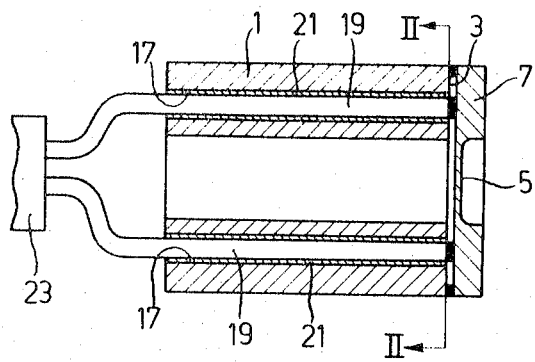
FIG. 1 is a longitudinal sectional view of a pressure transducer according to the invention.
Figure 2:
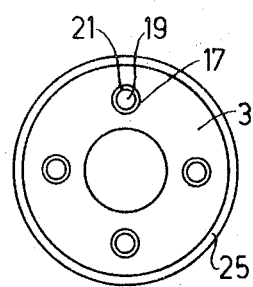
FIG. 2 is a front view of the end face of a support for the transducer shown in FIG. 1, FIGS. 3 and 4 are a front view and a cross-sectional view, respectively, of a semiconductor device incorporated in the pressure transducer of FIG. 1.

The pressure transducer shown in FIG. 1 consists of a tubular support 1 having an end face 3 to which a device 5, 7 for converting mechanical stresses into electrical signals is connected.

Figures 3, 4:
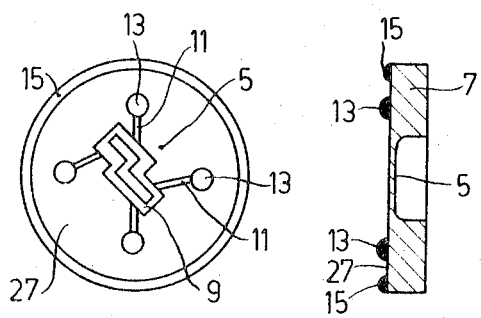

The device 5, 7 (see also FIGS. 3 and 4) is described in detail in the said Netherlands patent application 6817089. It mainly consists of a semiconductor diaphragm 5 having a thickened supporting rim 7, both parts being made of silicon. In the semiconductor diaphragm 5 an area 9 is formed by diffusion, the said area having resistors whose value changes when mechanical stresses occur in the diaphragm. Via conductor tracks 11, these resistors are connected to a number of electrical connection terminals 13 (four in the described example). The conductor tracks 11 consist of, for example, a vapour-deposited aluminium layer which continues as far as underneath the connection terminals 13, where on the aluminium layer a layer of nickel, a layer of copper and a layer of solder, preferably consisting of 60 percent tin and 40 percent lead, are successively deposited according to a known method, so that the connection terminals have the section of solder humps (see FIG. 4). In the same manner an annular area 15 which is covered with solder is provided about the connection terminals 13.

The support 1 comprises four ducts 17 which extend in its longitudinal direction and in which current supply conductors 19 are accommodated. This support is preferably made of a pyrex rod in which five holes are drilled to scale. This rod is subsequently heated to a temperature above the softening point of the pyrex, and it is drawn until the rod and the holes have the desired diameter. In this manner a rod having a length of many metres is obtained from which pieces of the desired length can be broken off. Each of these pieces forms a support 1. The diameter of the support is approximately 1.5 mm, and its length is approximately 6 mm.

The support 1 can also be made of another material such as synthetic resin or metal. However, pyrex has the advantage that its coefficient of expansion is approximately equal to that of silicon, i.e., the material of which the semiconductor device 5, 7 is made. Furthermore, the use of insulating material for the support has the advantage that no additional measures are required to insulate the current supply conductors 19 from the walls of the ducts 17.

The current supply conductors 19 can be made of a deformable, conductive material which is mounted after the drilling of the holes, and which is also deformed during the deformation of the rod, so that it completely fills the ducts 17 of the support 1. After completion of the support 1, however, the connections must yet be made between the current supply conductor 19 and a connection cable. Therefore, the current supply conductors 19 preferably consist of metal wires which are inserted through the ducts 17 and which are cemented in the ducts, for example, by means of an araldite layer 21. If desired, these metal wires can consist of the stripped ends of the conductive cores of a connection cable 23. The ends of the current supply conductors 19 are preferably, flat ground together with the end face 3 of the support 1, so that they are situated in this end face. On the end face 3 an annular conductive region 25 is provided whose dimensions correspond to those of the solder ring 15 present on the semiconductor device 5, 7. The annular region 25 preferably consists of successive vapour-deposited layers of chromium, nickel and copper, on which a layer of solder is galvanically deposited. If desired, a number of metal layers can alternatively provided on the outer tube wall, after which the individual supports are broken off and the end faces are flat ground after provision of the conductors 19. By dipping the end face 3 in a solder bath, a ring 25 of solder and solder bumps are formed on the conductor ends at the same time.

The semiconductor device 5, 7 is connected to the support 1 by pressing the face 27 which is provided with the connection terminals 13 against the end face 3, so that contact is established between the two rings 15 and 25, and between the connection terminals 13 and the ends of the conductors 19. The assembly is then heated in a reducing atmosphere until the solder melts. The soldered connection thus formed along the rings 15, 25 ensures that the support 1 is hermetically closed by the semiconductor device 5, 7, so that a pressure difference between the interior of the support 1 and the surroundings causes a deformation of the semiconductor diaphragm 5. Instead of the soldered connection, a glued connection can alternatively be used; a conductive kind of glue must then be used for the connection terminals 13. So as to simplify the positioning of the semiconductor device 5, 7 on the end face 3, the surface area of the connection terminals 13 can be made larger than shown in FIG. 3, if desired. In that case the connection terminals 13 are preferably given the shape of circle segments so that the semiconductor device can be arranged in a somewhat rotated position on the end face without objection.

Figure 5:
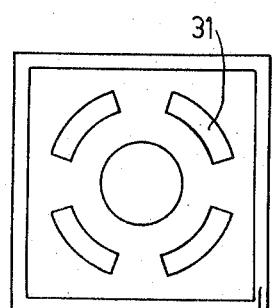
FIG. 5 is a front view of the end face of a pressure transducer according to the invention which is formed in a different manner.
Figure 6:
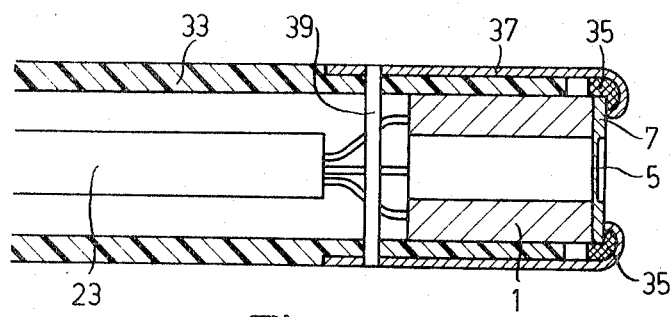
FIG. 6 is a longitudinal sectional view of the end part of a catheter to which a pressure transducer according to the invention is connected.

The pressure transducer described with reference to the FIGS. 1 to 4 has a circle-cylindrical shape. The advantage thereof is that the dimensions can be exceptionally small, which is very attractive, for example, for measuring blood pressure such as will be described with reference to FIG. 6. A drawback of this shape, however, is that the semiconductor device 5, 7 must have a circular circumference. Such devices are usually formed in large numbers in a silicon disc from which they are released by scribing a pattern of scribing lanes which are at right angles with respect to each other thereon by means of a diamond, the silicon disc being broken along these scribing lanes. Each of the pieces thus produced constitutes a semiconductor device. This method is very simple, is generally used and results in semiconductor devices having a rectangular shape. Consequently, if the dimensions permit, the use of a support having a square or rectangular section (see FIG. 5) is to be preferred. The conductive ring 29 then also has a square shape. If desired, the ducts 31 can have a more or less rectangular section, depending on the shape of the current supply conductors (not shown in FIG. 5).

The described pressure transducers are suitable for a large number of applications such as pressure measurements in combustion engines, transducers for sound or ultrasonic vibrations, and intravascular blood pressure measurements. A device for measuring the blood pressure in a blood vessel (see FIG. 6) preferably consists of a catheter 33 which is to be introduced into the blood vessel, a pressure transducer according to the invention being connected in the end of said catheter (shown only diagrammatically in FIG. 6). The inner diameter of the catheter 33 is substantially equal to the outer diameter of the support 1. For the protection of the pressure transducer the assembly is accommodated in a can 37 of a metal which does not adversely affect the blood, for example, stainless steel or platinum. So as to prevent a local increase of the outer diameter of the catheter, the wall of the catheter is made thinner at the area of the can 37 by an amount which is equal to the wall thickness of the can. If desired, the can 37 can be rigidly secured to the catheter 33 by means of a locking pin 39 which is preferably made of the same metal as the can. It is thus prevented that the can is liable to remain being in the blood vessel when the catheter is withdrawn. So as to close any openings between the end of the can 37 and that of the pressure transducer, an elastic mass 35, for example, silicon rubber, is provided. The connection cable 23 extends through the interior of the catheter 33 to the measuring equipment (not shown). The left-hand side of the semiconductor diaphragm 5 is connected via the catheter 33 to the atmosphere (or to an other reference pressure), the right-hand side being subjected to the blood pressure.

What is claimed is:

1. A pressure transducer for measuring fluid pressure, comprising:

a. a tubular support element having open ends and comprising channels extending longitudinally through the wall of said support element, each one of said channels being completely closed at the sides thereof by said support element wall and having open ends;
b. current supply conductors extending through respective ones of said channels and comprising respective end portions fixedly located at a first one of said support element ends;
c. device means for converting mechanical stresses into electrical signals, said device means being disposed at and closing said support element first end and comprising a semiconductor diameter having a relatively thick supporting rim and a relatively thin interior part; and
d. connection terminals disposed at a face of said supporting rim and connected to said end portions of said current supply conductors.

2. A pressure transducer as recited in claim 1, wherein said tube wall is of insulating material.

3. A pressure transducer as recited in claim 1, wherein said end portions comprise respective flat ground end faces.

4. A pressure transducer as recited in claim 1, wherein said supporting rim comprises an annular metallized region enveloping said connection terminals, said annular region being soldered to said end face of said support element, and said current supply conductors and said connection terminals being soldered together.

5. A pressure transducer as recited in claim 1, wherein said current supply conductors are metal wires, said wires being cemented in said channels.

* * * * *

UNITED STATES PATENT AND TRADEMARK OFFICE
CERTIFICATE OF CORRECTION

PATENT NO. : 3,838,379
DATED : September 24, 1974
INVENTOR(S) : ANTONIUS C.M. GIELES ET AL It is certified that error appears in the above—identified patent and that said Letters Patent are hereby corrected as shown below:

Column 5, line 14: change "diameter " to "diaphragm"

Signed and Sealed this

Twenty-fourth Day of August 1976

[SEAL]

Attest:

RUTH C. MASON
Attesting Officer

C. MARSHALL DANN
Commissioner of Patents and Trademarks